United States Patent
Wan

(10) Patent No.: US 7,717,630 B1
(45) Date of Patent: May 18, 2010

(54) LENS CAP WITH INTEGRAL REFERENCE SURFACE

(76) Inventor: Kevin Wan, 2602 E. Locust Ave., Orange, CA (US) 92867

( * ) Notice: Subject to any disclaimer, the term of this patent is extended or adjusted under 35 U.S.C. 154(b) by 228 days.

(21) Appl. No.: 11/851,890

(22) Filed: Sep. 7, 2007

(51) Int. Cl.
*G03B 17/00* (2006.01)
(52) U.S. Cl. ..................................... 396/448
(58) Field of Classification Search ................. 396/448; 359/511
See application file for complete search history.

(56) References Cited

U.S. PATENT DOCUMENTS

| | | | |
|---|---|---|---|
| 3,682,055 A | | 8/1972 | Okano et al. |
| 4,341,436 A | * | 7/1982 | Kanno et al. ................ 359/511 |
| 4,473,289 A | | 9/1984 | Wallace |
| 5,119,178 A | * | 6/1992 | Sakata et al. ............. 348/223.1 |
| 5,148,288 A | | 9/1992 | Hannah |
| 5,162,942 A | | 11/1992 | Anzai et al. |
| 5,255,120 A | | 10/1993 | Anzai et al. |
| 6,075,563 A | * | 6/2000 | Hung ...................... 348/223.1 |
| 6,271,920 B1 | | 8/2001 | Macfarlane et al. |

2006/0038901 A1 2/2006 Tapes

FOREIGN PATENT DOCUMENTS

| | | | |
|---|---|---|---|
| JP | 2003284081 A | * | 10/2003 |
| WO | WO 2006/013383 A1 | | 2/2006 |
| WO | WO 2007/011107 A1 | | 1/2007 |

OTHER PUBLICATIONS

QPcard 101 product website, URL: http://www.qpcard.se/files2/qp101.htm, Internet Archive Copy dated Apr. 9, 2005.*
Digital Greycap product website by Stephen Johnson Photography, URL: http://www.sjphoto.com/graycap.html, Internet Archive Copy dated Oct. 22, 2006.*
"Understanding Metering", posted by Kevin M on WetCanvas.com Forums on May 10, 2003, URL: http://www.wetcanvas.com/forums/showthread.php?t=106407.*
"Digital GrayCAP", Johnson, Stephen, http://www.sjphoto.com/graycap.html.

* cited by examiner

*Primary Examiner*—W. B. Perkey
*Assistant Examiner*—Leon W Rhodes
(74) *Attorney, Agent, or Firm*—Aaron McGushion

(57) ABSTRACT

A lens cap for a camera is disclosed, comprising: a reference surface, the reference surface having the capability of being used to calibrate an exposure setting or a white balance setting of a photographic subject; wherein the lens cap is placed in front of a lens of the camera in the lighting conditions of the photographic subject, the reference surface being directed towards the lens; and wherein an intensity of the visible light spectrum being reflected by the reference surface is detected.

10 Claims, 4 Drawing Sheets

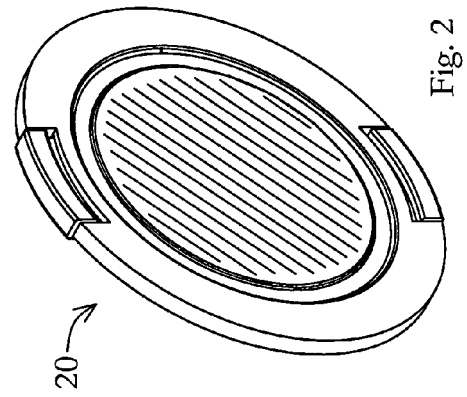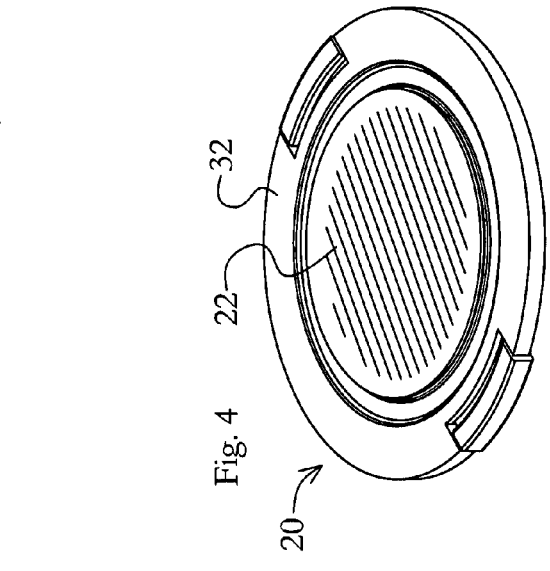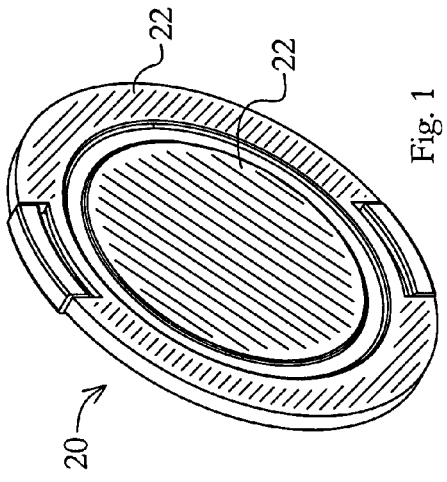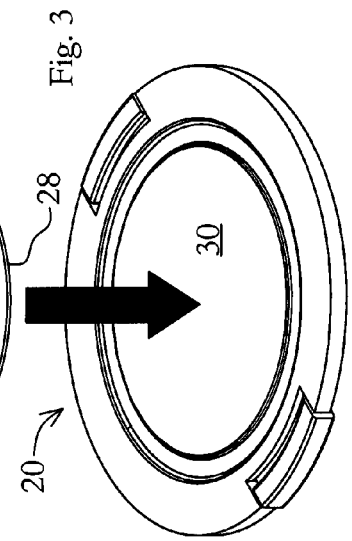

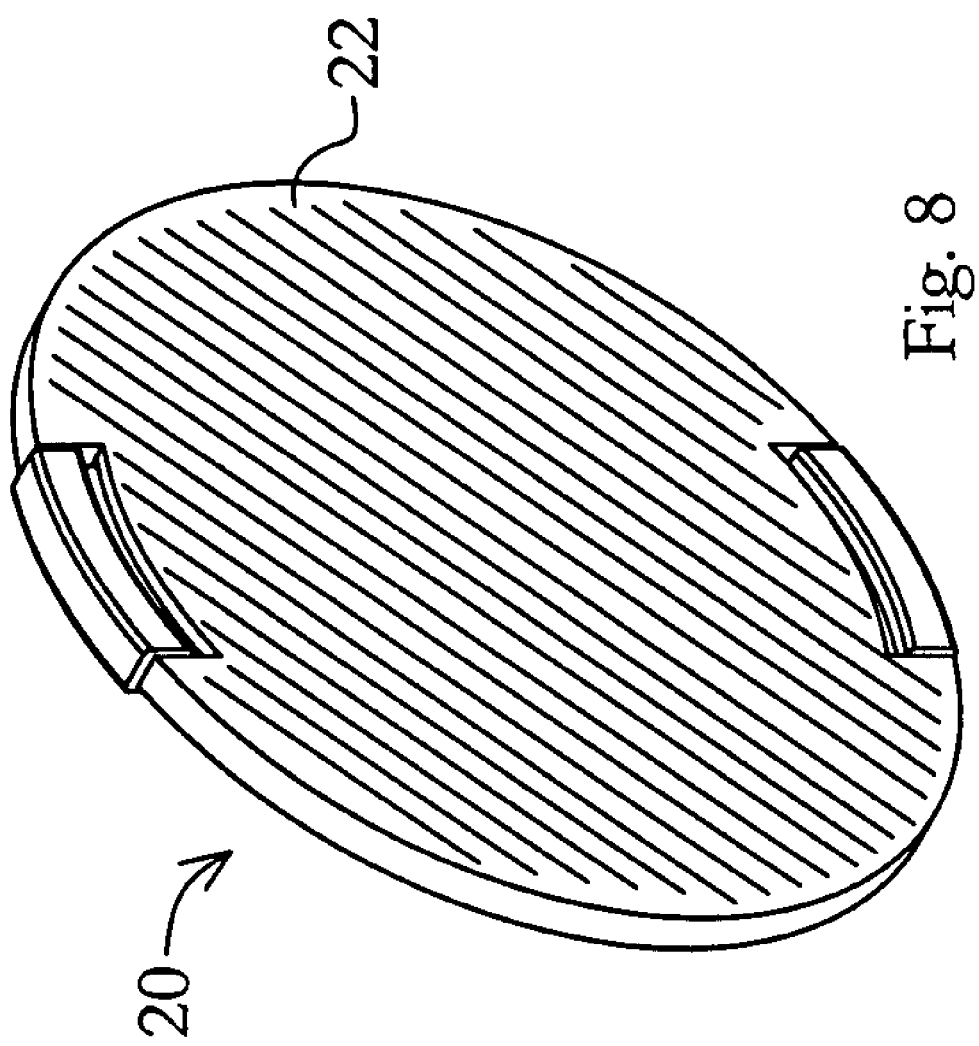

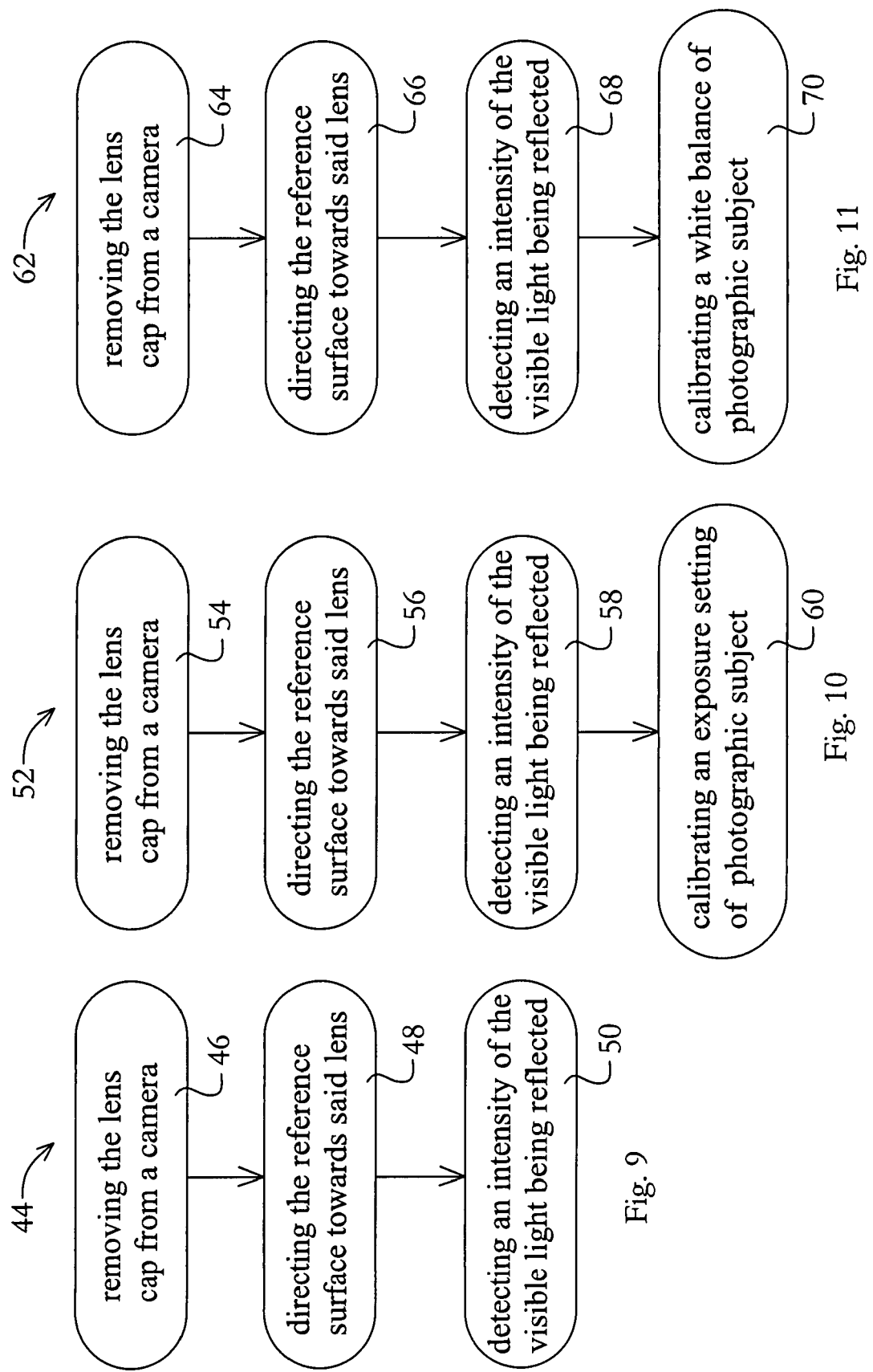

LENS CAP WITH INTEGRAL REFERENCE SURFACE

FIELD OF INVENTION

The present invention relates generally to the field of photography. More particularly, the present invention relates to calibration references for photographic subjects.

BACKGROUND OF THE INVENTION

Gray cards and other calibration and reference cards and tools are often used in photography to adjust the settings of a camera to compensate for ambient or studio lighting conditions. For example, using a gray card, the photographer places the gray card in the vicinity of the photographic subject, thereafter taking a reading with a light meter (being either stand-alone or integral to the camera), and adjusts the settings such as the shutter speed and aperture size to obtain the proper exposure for that particular lighting condition.

Although the term "gray card" is often used, describing the common color of the card, these reference cards can be created with various colors, such as black, white, or gray, as well as various surface textures and reflective characteristics. Often, the gray colored card, usually 18% gray, is used to determine the proper exposure settings for a given photographic subject lighting condition. A white colored card can be used to adjust the color or white balance. Black and various shades of colors, such as the colors found in the GretagMacbeth ColorChecker Chart can be used for various adjustments, both during the photographic process and during development or digital processing.

These existing cards come in a variety of materials and sizes. They could be made of cloth, cardboard, plastic, and the like, with at least one surface coated with a reference color or material. More often than not, the materials should be matt in finish, to reduce glare. The size of the card could vary, including 8"×10", 2"×3.5", and so on.

The common problem with all existing gray cards, is that they are an accessory to the camera, either being attached by a lanyard or carried separately. Photographers, have a need to carry many pieces of equipment beyond the camera itself, including various lenses, film, flash memory, tools, and so on. The gray card is one more item to pack and carry around. Basically, they can be bulky and inconvenient to carry at all times, especially for the photographer that is traveling light.

Some current technologies to calibrate white balance include a filter on a lens cap. The lens cap is left on the lens during the calibration process. The light enters through the filter of the lens cap, being read by an in-lens digital sensor. Instead of relying on reflected light from a gray card near the photographic subject, it relies on filtered light for white balance, allowing through the filter a specific wavelength of visible light.

What is needed and heretofore not provided is a reference surface, such as an 18% gray surface, that is compact. What is also needed is a reference surface that is an integral part of the equipment necessary to photography. Additionally, what is needed is a reference surface that is easy to use and instantly available at all times during the photographic process.

SUMMARY OF THE INVENTION

The present invention provides a compact reference surface that is an integral part of the lens cap of a camera. Therefore, because the lens cap is always attached to the lens of a camera, the reference surface will always be instantly available for use at all times.

A lens cap device is disclosed for use by photographers and printers to aid in determining the exposure settings, lighting ratio, and white or color balance. A lens cap for a camera is disclosed, comprising: a reference surface, the reference surface having the capability of being used to calibrate an exposure setting or a white balance setting of a photographic subject; wherein the lens cap is placed in front of a lens of the camera in the ambient or studio lighting conditions of the photographic subject, the reference surface being directed towards the lens; and wherein an intensity of the visible light spectrum being reflected by the reference surface is detected.

The reference surface can be created from the raw material used to mold the lens cap, such as polycarbonate and other materials used in lens cap manufacture, where the color of the raw material, pellets for instance, is the desired color of the reference surface. Or the reference surface can be applied to a substrate; and that substrate can be applied to the lens, either being fastened or otherwise bonded to at least part of the surface of the lens.

The color, texture, and other reflectance properties can be varied, depending on the end use. Different models may have different colors, such as gray, black, white, or a combination of the three. Ideally, the black absorbs 100% of light incident on it, the white absorbs 0% of light incident on it, and the gray absorbs an intermediate percentage of light incident on it. However, in practice, these ideal qualities are not always possible or practical; so, the reflectance can vary according to industry standards. Often, it is preferred by many to use a surface that is 18% gray, where 18% of light incident on it is reflected.

A brace can be added to the lens cap. In one preferred embodiment, the brace is similar in action to the easel back found on many picture frames, being comprised of a strip pivoting out from the lens cap, supporting it in a freestanding orientation, with the reference surface preferably in the ambient lighting conditions of the photographic subject and visible by the lens in at least the calibration portion of the photographic process. The brace can be pivoted back into a nested position, clipped into the back surface of the lens cap, the back surface being the surface facing the lens when installed, and the front surface facing away form the lens. It is preferred that at least the front surface has the reference surface integrated. Other compatible brace apparatus known in the industry can be compatible and used with the present invention.

Any camera means that utilizes a lens cap would be compatible with the lens cap of the present invention. The compatible camera means could include still cameras, digital or film cameras, video cameras, and any camera that requires a lens cap.

BRIEF DESCRIPTION OF THE DRAWINGS

FIG. 1 is an illustration of the lens cap of the present invention.

FIG. 2 is an illustration of an alternate embodiment of the lens cap of the present invention FIG. 3 is an illustration of an alternate embodiment of the lens cap of the present invention, showing a substrate being mated to a lens cap FIG. 4 is an illustration of an alternate embodiment of the lens cap of the present invention, showing a substrate mated to a lens cap.

FIG. 8 is an illustration of an alternate embodiment of the lens cap of the present invention, showing a planar reference surface.

FIG. 9 is a flow chart showing a method of use for the present invention.

FIG. 10 is a flow chart showing an alternate method of use for the present invention.

FIG. 11 is a flow chart showing another alternate method of use for the present invention.

DESCRIPTION OF THE PREFERRED EMBODIMENTS

Figure 6:
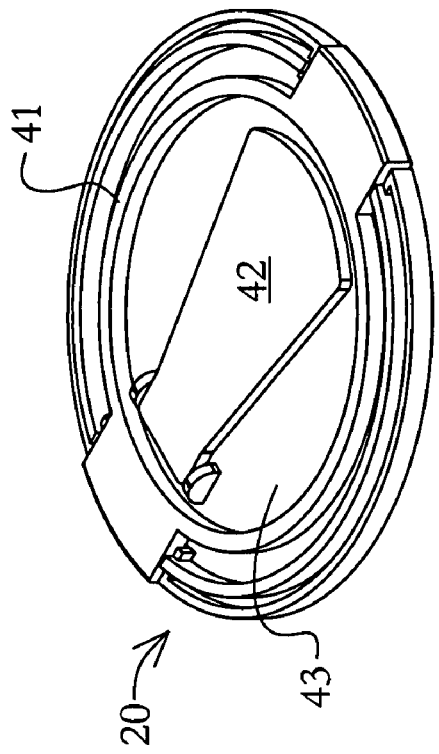
FIG. 6 is an illustration of an alternate embodiment of the lens cap of the present invention, showing the brace means.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Looking now at FIG. 1, the lens cap 20 of the preferred embodiment of the present invention is shown. It can be seen that the entire surface of the lens cap 20 is a reference surface 22. The reference surface 22 can be of many colors and textures, depending on the photographic or videographic needs of the user (photographer or videographer). The reference surface can be white, black, or gray in color. It can have a smooth, shiny surface quality or dull surface quality. It is more often preferred by photographers to have a surface color and texture that reflects approximately 18% of the light incident on it, also called 18% gray.

This can be manufactured by choosing material with the appropriate color or a color that will, after the molding process, arrive at the appropriate color. As indicated, the various parts of the lens cap 20 can be molded using injection molding processes that are well known in industry; or the lens cap 20 can be manufactured by any process appropriate for the product. By this means, the raw material used, thereafter comprising the primary parent material of the lens cap 20, is the color required for the reference surface 22.

The surface of the mold's cavity (not shown) can be treated to create the desired surface quality of the lens cap 20 manufactured therein. The desired surface may be smooth or of various levels of roughness. The mold's surface can be created through polishing, media blasting, chemical treatment, or many other treatments known in industry. Additionally, it is possible to treat the reference surface 22 itself to create the desired surface qualities after the molding process, again including polishing, media blasting, chemical treatment, or many other treatments known in industry.

The lens cap 20, often made from plastic or the like, may be made in one molded piece or multiple parts assembled after the molding process. Not every part within the assembly needs to be a reference surface; for instance, it is preferred that the outer surface of the lens cap 20 (being visible when installed on a camera lens) acts as a reference surface. However, the reverse side, although having the appropriate color, does not necessarily need to have the correct surface qualities, although it may. Other parts in the assembly, such as the attachment ring 41 and such, also do not need to have the exacting qualities needed in the reference surface 22.

An alternate embodiment of the lens cap 20 of the present invention can be seen in FIG. 2. Instead of the raw material of the lens cap 20 being the reference color, the reference surface 22 is applied to the surface of the lens cap 20, potentially leaving part of the lens cap 20 as a non-reference surface 32. The exact percentage of the exposed surface that would need to be coated with the reference surface 22 depends on the application, although the full advantages of the present invention can be realized even when the coverage is relatively small. So, at least part of the non-reference surface 32 must be coated with the reference surface 22, leaving the remainder uncoated.

The coating process and material can be chosen among many that produce the desired reference surface. These processes could include a printing process (such as screen printing and the like), where the graphic of the reference surface is directly deposited or bonded to the surface of the lens cap 20; it could include a coating process, where a coating is bonded or applied to the surface, such as paint, coloring, rubberized surface, or many other known and available processes that can create an appropriate surface.

Looking at FIGS. 3 and 4, yet another alternate embodiment of the present invention can be seen. Looking particularly at FIG. 3, a reference surface 22 is applied to a top side 26 of a substrate 24. Again, the reference surface 22 can be applied to the substrate 24 by many means known in industry, including a printing process, painting process, or other deposition processes. The substrate 24 can be selected from among many materials that have the capability of supporting the reference surface 22, including, but not limited to, plastic, paper, or metal. The substrate 24 can be rigid or flexible in nature. The reference surface 22 applied to the substrate 24 can be of various thicknesses. A thicker application may be preferred, to allow repair of the reference surface 22 by sanding or buffing when scratched or stained.

The substrate 24 is applied to the surface 30 of the lens cap 20, preferably by bonding the bottom side 28 to the surface 30 by gluing, fastening, or any other known bonding means. The substrate 24 can also be inserted into a slot or other holding means formed on or fastened to the lens cap 20. FIG. 4 shows the substrate 24 attached to the lens cap 20, to create a reference surface on any available lens cap 20, with part of the lens cap 20 acting as a reference surface 22 and part acting as a non-reference surface 32.

Figure 5:
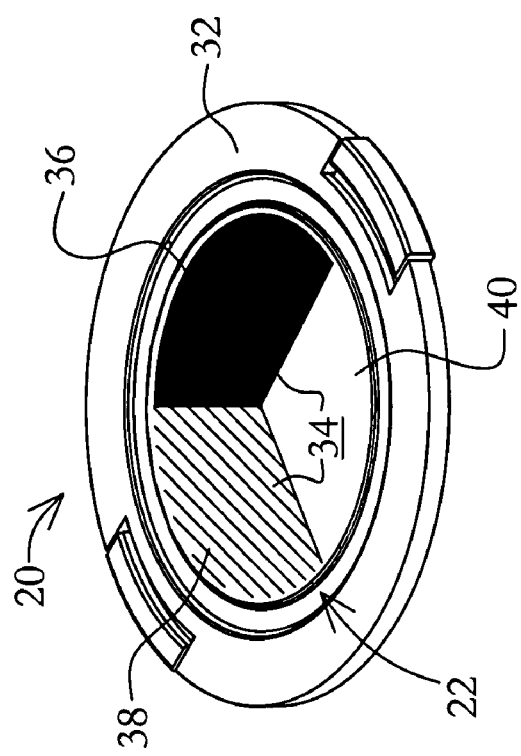
FIG. 5 is an illustration of an alternate embodiment of the lens cap of the present invention, showing a possible reference scheme.

Another alternate embodiment of the present invention is shown in FIG. 5. Instead of the reference surface 22 consisting of just one color, it can be comprised of a plurality of colors and textures. A graphic 34 is applied either directly on the lens cap 20 or to a substrate 24 that is bonded to the lens cap 20. In this example, the reference surface 22, is divided into three sections, a white surface 40, a black surface 36, and a gray surface 38. This exemplary embodiment is just one of many available. Other color schemes, designs, and lines can be applied as a graphic 34 to create the desired reference surface 22.

Figure 7:
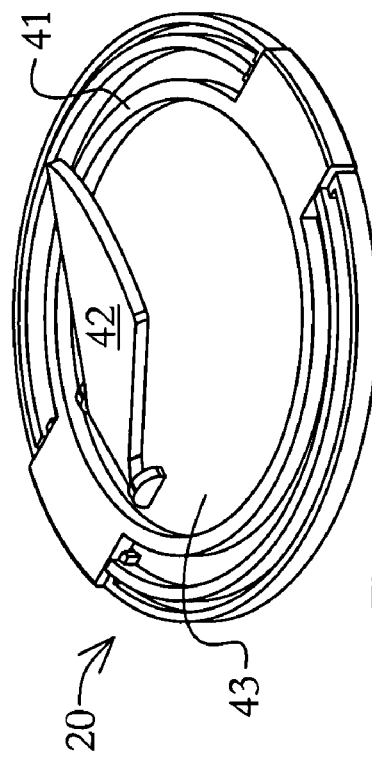
FIG. 7 is an illustration of an alternate embodiment of the lens cap of the present invention, showing the brace means extended.

At times, it may not be practical for the photographer or human subject to hold the lens cap 20 with the reference surface 22 being directed towards a camera or meter. In this scenario, it would be advantageous to have a self supporting lens cap 20 that does not require being held or rigged to face the camera or meter. One possible solution allow for a freestanding lens cap 20 is to provide a brace 42 that is pivoted on one end, being free to rotate about that pivot. Looking at FIG. 6, when the brace 42 is not needed, it pivots against the back surface 43 of the lens cap 20. In this position, the brace 42 does not interfere with the operation of the lens cap 20, either on or off the camera. FIG. 7 shows the brace 42 pivoted away from the back surface 43 of the lens cap 20. In this position, the lens cap 20 can be placed on a surface, such as a table, being supported in a position allowing the camera or meter to receive reflected light from the reference surface 22. The lens cap 20 is supported by the brace 42, much in the same way as a picture frame using an easel back.

Looking at FIG. 8, yet another embodiment of the lens cap 20 of the present invention can be seen. To maximize the reference surface 22, an uninterrupted, flat plane is molded into the lens cap 20. With no creases or depressions, almost the entire area of the front of the lens cap 20 can be used. Any of the previously mentioned methods for applying the reference surface 22 may be used with this embodiment.

Several methods for using the lens cap 20 with a reference surface 22 can be seen in FIGS. 9-11. The first method 44 seen in FIG. 9 is a method for utilizing a lens cap with an integral reference surface comprising the steps of: removing the lens cap with a integral reference surface from a camera (step 46); directing said integral reference surface towards said lens in the lighting conditions of a photographic subject (step 48); and detecting an intensity of the visible light spectrum being reflected by said reference surface (step 50).

The second method 52 seen in FIG. 10 is a method for utilizing a lens cap with an integral reference surface comprising the steps of: removing the lens cap with a integral reference surface from a camera (step 54); directing said integral reference surface towards said lens in the lighting conditions of a photographic subject (step 56); detecting an intensity of the visible light spectrum being reflected by said reference surface (step 58); and calibrating an exposure setting of said photographic subject (step 60).

The third method 62 seen in FIG. 11 is a method for utilizing a lens cap with an integral reference surface comprising the steps of: removing the lens cap with a integral reference surface from a camera (step 64); directing said integral reference surface towards said lens in the lighting conditions of a photographic subject (step 66); detecting an intensity of the visible light spectrum being reflected by said reference surface (step 68); and calibrating an white balance of said photographic subject (step 70).

While the present invention has been described with regards to particular embodiments, it is recognized that additional variations of the present invention may be devised without departing from the inventive concept.

Having thus described the invention, it is now claimed:

1. A lens cap for a camera comprising:
  a reference surface on a front surface, said reference surface having the capability of being used to calibrate at least an exposure setting or a white balance setting of a photographic subject;
  a brace pivotably coupled to a back surface of said lens cap, said brace configured to pivot away from said back surface and support a free-standing of said lens cap in a desired position apart from said camera, said brace being retractable and substantially not interfering with standard operation and function of said lens cap, said back surface being oriented towards a lens when said lens cap is coupled to said camera;
  wherein said lens cap is placed in front of a lens of said camera in the lighting conditions of said photographic subject, said reference surface being directed towards said lens.

2. The lens cap of claim 1, wherein said reference surface is primarily a parent material of the lens cap, said parent material being made of a raw material, said raw material being a desired reference color, said parent material having a desired surface quality.

3. The lens cap of claim 1, wherein said reference surface is applied directly to a parent material.

4. The lens cap of claim 3, wherein said reference surface is a graphic printed on said parent material.

5. The lens cap of claim 1, wherein at least a portion of said reference surface is gray in color.

6. The lens cap of claim 5, wherein said reference surface reflects approximately 18 percent of light incident on it.

7. The lens cap of claim 1, wherein at least a portion of said reference surface is substantially black in color.

8. The lens cap of claim 1, wherein at least a portion of said reference surface is substantially white in color.

9. The lens cap of claim 1, wherein a first portion of the reference surface is gray in color, a second portion of the reference surface is black in color, and a third portion of the reference surface is white in color.

10. A method for utilizing a lens cap with an integral reference surface and a brace pivotably connected thereto, comprising the steps of:
  a) removing the lens cap from a camera;
  b) supporting the free-standing of said lens cap in a desired position away from said camera utilizing said brace;
  c) directing said integral reference surface towards said lens in the ambient lighting conditions of a photographic subject;
  d) detecting an intensity of the visible light spectrum being reflected by said reference surface.

* * * * *